United States Patent [19]

Yamanaka et al.

[11] 4,144,225

[45] Mar. 13, 1979

[54] NOVEL AROMATIC DIAMINE COMPOUNDS AND FLAME-RESISTANT POLYAMIDE COMPOSITIONS CONTAINING SAID COMPOUNDS

[75] Inventors: Keio Yamanaka; Kazuo Okamoto; Yoshikatsu Mizukami, all of Osaka, Japan

[73] Assignee: Kanebo, Ltd., Tokyo, Japan

[21] Appl. No.: 713,651

[22] Filed: Aug. 12, 1976

[30] Foreign Application Priority Data

Aug. 18, 1975 [JP] Japan .................................. 50-100468
Oct. 14, 1975 [JP] Japan .................................. 50-123947
Apr. 24, 1976 [JP] Japan .................................. 51-46930

[51] Int. Cl.² ...................... C08K 5/41; C07C 147/13; C08K 5/20; C07C 103/127
[52] U.S. Cl. ........................ 260/45.9 NC; 260/562 P; 260/562 R
[58] Field of Search ................... 260/45.9 NC, 562 P, 260/562 R, 32.6 NA; 424/324; 71/118

[56] References Cited

U.S. PATENT DOCUMENTS

| | | | |
|---|---|---|---|
| 2,028,715 | 1/1936 | Hanson | 260/45.7 RL |
| 2,443,255 | 6/1948 | Kvalnes | 260/562 |
| 2,560,939 | 7/1951 | Faith | 260/562 |
| 2,986,491 | 5/1961 | Goldman et al. | 260/562 R |
| 3,138,572 | 6/1964 | Leandri | 260/45.9 NC |
| 3,189,647 | 6/1965 | Symon | 260/562 |
| 3,523,137 | 8/1970 | Moore | 260/45.9 NC |
| 3,539,629 | 11/1970 | Mackellar et al. | 260/561 R |
| 3,557,211 | 1/1971 | Rumanowski | 260/562 |
| 3,663,620 | 5/1972 | Merianos et al. | 424/324 |
| 3,824,287 | 7/1974 | Matthias et al. | 260/561 R |
| 3,830,766 | 8/1974 | Eberhard et al. | 260/28.5 B |
| 3,846,469 | 11/1974 | Gunsher et al. | 260/45.85 |
| 3,886,212 | 5/1975 | Kunstle et al. | 260/562 |

OTHER PUBLICATIONS

Fire Retardants: Proceedings of 1974 International Symposium on Flammability and Fire Retardants-1974, pp. 68 to 77-Green et al-Technomic Pub. Co., Westport Connecticut.
SPE Journal May 1973 - vol. 29, pp. 36 to 40-Hoke.
Industrial Engineering Chemistry, Product Research Development-vol. 13, No. 2, 1974, pp. 139 to 144-- Gilleo.

Journal of the American Chem. Socty., vol. 56, No. 9, Sep. 1934, pp. 1944 to 1946.
Beilsteins Handbuch der Organische Chemie Dreizehnter Band Erster Band, pp. 174, 270 and 458.
Journal of the Chemical Socty (London) 1943, pp. 233 to 235.
Helvetica Chimica Acta-vol. XXII, 1939, pp. 3 to 16.

*Primary Examiner*—V. P. Hoke
*Attorney, Agent, or Firm*—Blanchard, Flynn, Thiel, Boutell & Tanis

[57] ABSTRACT

Novel N,N,N',N'-tetraacetyl aromatic diamine compounds shown by the general formula (1)

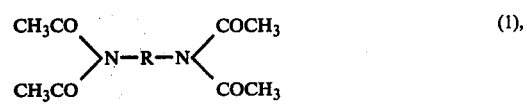

wherein R is

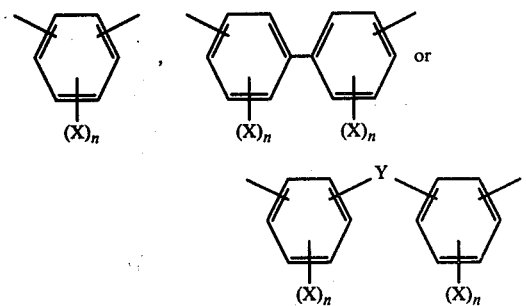

X is Br or Cl, Y is alkylene group or akylidene group having 1-3 carbon atoms, carbonyl group, sulfonyl group or oxygen atom and m and n is 0 or an integer of 1-4, are produced by reacting 1 mole of aromatic diamine having the general formula

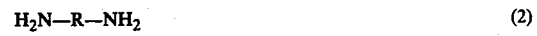

with at least 4 moles of acetic anhydride. These compounds are used as a flame retardant for polyamides.

22 Claims, No Drawings

NOVEL AROMATIC DIAMINE COMPOUNDS AND FLAME-RESISTANT POLYAMIDE COMPOSITIONS CONTAINING SAID COMPOUNDS

The present invention relates to novel N,N,N',N'-tetraacetyl aromatic diamine compounds, a flame retardant consisting of the compounds, a method for producing the compounds, a flame-resistant polyamide composition containing the compound and a flame-resistant polyamide fiber containing the compound.

Polyamides, particularly nylon-6 and nylon-66 are widely used as a material for fibers and other shaped articles due to their excellent mechanical property and dyeability and beautiful appearance. However, polyamides are flammable and the use of polyamides is limited.

In order to provide flame resistance to polyamides, it has been known to treat the surface of a shaped article of polyamide, for example the surface of polyamide fiber, with a flame retardant, such as thiourea, but in such a process a large amount of the flame retardant must be adhered to the polyamide shaped article in order to obtain a sufficient flame-resistant effect and therefore the appearance and feeling of the product are seriously damaged and further the obtained flame resistance of the product is poor in durability.

In order to obviate these drawbacks, various attempts for adding a flame retardant to a polyamide before the shaping of the polyamide have been proposed. However, many of the hitherto proposed flame retardants cause decomposition and gelation of the polyamide when the flame retardant is melted and mixed with the polyamide. As the result, the excellent physical properties inherent to the polyamide are deteriorated and the commercial value thereof is considerably damaged. Alternatively, since the flame retardant is unstable against light and heat, the polyamide is colored due to the light degradation or the termal decomposition.

Furthermore, even if a flame retardant has no such defect, the compatibility with the polyamide is poor and the flame-resistant polyamide obtained by compounding such a flame retardant becomes dirty white or even when such a dirty white phenomenon does not occur, the flame retardant bleeds out on the polyamide surface after processing or during use. Such a bleeding out phenomenon causes a great trouble when the polyamide is formed into fibers. Namely, in the steps of spinning, drawing and warping, the flame retardant bleeds out on the surface of the fibers and becomes powdery and sticks on the guides and rollers to cause yarn breakage and it is difficult to operate for a long time and the industrial production is substantially impossible. Such flame-resistant polyamide shaped articles, for example, the fiber products, readily strip off or bleed out the flame retardant during washing, dry cleaning or using and the flame resistance lowers and health problems are caused.

As flame retardants which do not cause these problems, in Japanese Patent No. 936,069 aromatic amide compounds having a brominated nucleus have been proposed. However, such aromatic amide compounds having a brominated nucleus are not sufficient in the compatibility with a polyamide. Namely, when the polyamide added with said aromatic amide compounds having brominated nucleus is melt spun and drawn into filaments, said compounds do not substantially bleed out on the surface of the fibers in the melt spinning step and the flame retardant does not substantially deposit on the spinning guide but if such undrawn filaments are drawn in a drawing ratio of more than 3.0 times, the flame retardant bleeds out on the surface of the fibers and sticks to a drawing guide, a roller and the like and the yarn breakage and the monofilament breakage are caused. Furthermore, the obtained polyamide fibers become opaque and the commercial value is considerably lowered. The flame retardant in the above described patent has an amide bond in order to increase its compatibility with a polyamide, while the brominated aromatic nucleus, which is incompatible with the polyamide, is contained in the common molecule and the amide bond has limited effectiveness in improving the compatibility of such incompatible portion, so that such flame retardants cannot be satisfactory in their compatibility with the polyamide.

As mentioned above, the already known flame retardants for polyamides have various defects and in particular when a polyamide is made flame-resistant by compounding a flame retardant, various defects of the flame retardant appear, so that the flame retardant has never been practically used.

The inventors have studied with respect to compounds which do not deteriorate the excellent properties inherent to a polyamide, even if said compounds are compounded to the polyamide and an excellent flame resistance can be given to the polyamide by adding a small amount and found that N,N,N',N'-tetraacetyl aromatic diamine compounds are excellent as flame retardants for polyamides and the present invention has been accomplished.

An object of the present invention is to provide novel N,N,N',N'-tetraacetyl aromatic diamine compounds.

A further object is to provide a flame retardant which does not cause various defects as do the conventional flame retardants and can give an excellent flame resistance to a polyamide when added in a small amount.

Another object is to provide a method for producing the above described aromatic diamine compounds commercially easily and inexpensively.

The other object is to provide polyamide compositions and fibers thereof which have durable flame resistance without deteriorating the various excellent properties of the polyamide.

That is, the present invention consists in novel N,N,N',N'-tetraacetyl aromatic diamine compounds having the general formula (1).

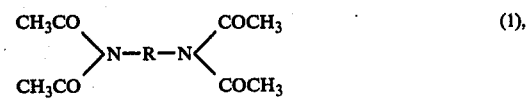

wherein R is

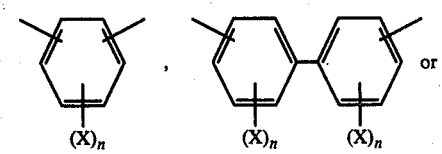

-continued

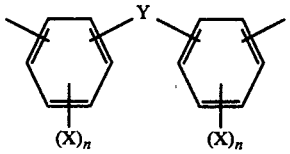

wherein X is Br or Cl, Y is an alkylene group or alkylidene group having 1-3 carbon atoms, carbonyl group, sulfonyl group or oxygen atom and m and n are 0 or an integer of 1-4, a flame retardant consisting of said compounds, a method for producing said compounds and flame-resistant polyamide compositions and the fibers containing 0.5-15% by weight based on the total weight of the polyamide compositions or the fibers, of said compounds.

N,N,N',N'-tetraacetyl aromatic diamine compounds shown by the general formula (1) of the present invention are produced by reacting 1 mole of aromatic diamine shown by the general formula (2)

$$H_2N-R-NH_2 \qquad (2)$$

with at least 4 moles of acetic anhydride with heating.

The aromatic diamines shown by the general formula (2) are, for example, phenylenediamines, such as m-phenylenediamine, p-phenylenediamine, 2,5-dichloro-p-phenylenediamine, 2,5-dibromo-p-phenylenediamine, 2,4,6-trichloro-m-phenylenediamine, 2,4,6-tribromo-m-phenylenediamine, etc; diaminobiphenyls, such as 2,2'-diaminobiphenyl, 4,4'-diaminobiphenyl, 3,3'-dichloro-4,4'-diaminobiphenyl, 3,5,3',5'-tetrabromo-4,4'-diaminobiphenyl, etc; diaminodiphenylmethanes, such as 4,4'-diaminodiphenylmethane, 3,3'-diaminodiphenylmethane, 2,2'-diaminodiphenylmethane, 3,3'-dichloro-4,4'-diaminodiphenylmethane, 2,2'-dichloro-4,4'-diaminodiphenylmethane, 3,5,3',5'-tetrachloro-4,4'-diaminodiphenylmethane, 3,5,3',5'-tetrabromo-4,4'-diaminodiphenylmethane, etc.; diaminobibenzyls, such as 4,4'-diaminobibenzyl, 3,5,3',5'-tetrabromo-4,4'-diaminobibenzyl, etc.; 2,2-bisaminophenylpropanes, such as 2,2-bis(4'-aminophenyl)propane, 2,2-bis(3',5'-dichloro-4'-aminophenyl)propane, 2,2-bis(3',5'-dibromo-4'-aminophenyl)propane, etc.; diaminodiphenylsulfones, such as 4,4'-diaminodiphenylsulfone, 3,5,3',5'-tetrachloro-4,4'-diaminodiphenylsulfone, 3,5,3',5'-tetrabromo-4,4'-diaminodiphenylsulfone, etc.; diaminobenzophenones, such as 4,4'-diaminobenzophenone, 2,2'-diaminobenzophenone, 3,3'-dichloro-4,4'-diaminobenzophenone, 3,5,3',5'-tetrabromo-4,4'-diaminobenzophenone, 3,5,3',5'-tetrachloro-4,4'-diaminobenzophenone, etc.; diaminodiphenyl ethers, such as 3,3'-diaminodiphenyl ether, 4,4'-diaminodiphenyl ether, 3,3'-dibromo-4,4'-diaminodiphenyl ether, etc.

The compounds of the present invention are produced by reacting said aromatic diamine with acetic anhydride by heating. The molar ratio of said acetic anhydride to said diamine is at least 4, preferably at least 6.

A reaction solvent may be not used or a solvent which does not react with the above described diamine and acetic anhydride and can boil the reaction solution at a temperature of higher than 105° C. under atmospheric pressure, for example, xylene, chlorobenzene, dioxane, acetic acid and mixtures thereof may be used. In general, no catalyst is needed but in order to promote the reaction velocity, catalysts, for example, sulfuric acid, bromine compounds and the like may be used.

The reaction temperature is not lower than 105° C., preferably not lower than 120° C., more particularly 120°-180° C. If the reaction is carried out at a temperature of lower than 105° C., the yield of the product is very low, so that such a temperature should be avoided. If the reaction is effected at a temperature of higher than 180° C., the diamine is modified and the by-product is formed and the object product having a high quality cannot be obtained.

The reaction time is preferably at least 10 minutes at the above described reaction temperature excluding the temperature raising time and the cooling time. When the reaction time is less than 10 minutes, the yield lowers, so that such a time is not preferable. The reaction time relates to the reaction temperature and when the reaction temperature is lower than 130° C., it is preferable to maintain said reaction temperature for at least 15 minutes. The reaction time is usually 0.5-2 hours.

In general, the organic reaction is slow in the reaction velocity, so that a long reaction time is necessary. Accordingly, the operation efficiency of the installation becomes low but in the above described process of the present invention the reaction time is short and the operation efficiency of the installation is good. Thus, the compounds of the present invention can be produced easily and inexpensively.

N,N,N',N'-tetraacetyl aromatic diamine compounds of the present invention obtained as described above are shown by the above described general formula (1). R in the formula is

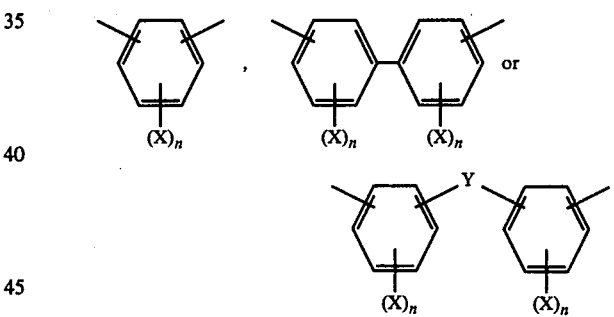

and X is Br or Cl but in particular when X is Br, the property of said compounds as a flame retardant for a polyamide is more improved, so that such compounds are preferable, Y is alkylene group or alkylidene group having 1-3 carbon atoms, carbonyl group, sulfonyl group or oxygen atom but methylene group is preferable in view of the production cost, m and n are 0 or an integer of 1-4 but in view of the heat stability, m is preferred to be 2-3, more particularly 3 and n is preferred to be 2. The substituted position of X is preferred to be ortho-position against the amino group.

As the preferred compounds among N,N,N',N'-tetraacetyl aromatic diamine compounds shown by the general formula (1), mention may be made of N,N,N',N'-tetraacetyl-p-phenylenediamine, N,N,N',N'-tetraacetyl-2,5-dichloro-p-phenylenediamine, N,N,N',N'-tetraacetyl-2,5-dibromo-p-phenylenediamine, N,N,N',N'-tetraacetyl-m-phenylenediamine, N,N,N',N'-tetraacetyl-2,4,6-trichloro-m-phenylenediamine, N,N,N',N'-tetraacetyl-2,4,6-tribromo-m-phenylenediamine, N,N,N',N'-tetraacetyl-4,4'-diaminobiphenyl, N,N,N',N'-tetraacetyl-3,5,3',5'-tetrabromo-4,4'-diaminobiphenyl, N,N,N',N'-tetraacetyl-4,4'-diaminodiphenylmethane, N,N,N',N'-tetraacetyl-3,3'-dichloro-4,4'-diaminodiphenylmethane, N,N,N',N'-tetraacetyl-2,2'-dichloro-4,4'-diaminodiphenylmethane, N,N,N',N'-tetraacetyl-3,5,3',5'-tetrachloro-4,4'-diaminodiphenylmethane, N,N,N',N'-tetraacetyl-3,5,3',5'-tetrabromo-4,4'-diaminodiphenylmethane, N,N,N',N'-tetraacetyl-3,5,3',5'-tetrabromo-4,4'-diaminobibenzyl, 2,2-bis(N,N-diacetyl-3',5'-dichloro-4'-aminophenyl)propane, 2,2-bis(N,N-diacetyl-3',5'-dibromo-4'-aminophenyl)propane, N,N,N',N'-tetraacetyl-4,4'-diaminodiphenylsulfone, N,N,N',N'-tetraacetyl-3,5,3',5'-tetrachloro-4,4'-diaminodiphenylsulfone, N,N,N',N'-tetraacetyl-3,5,3',5'-tetrabromo-4,4'-diaminodiphenylsulfone, N,N,N',N'-tetraacetyl-2,4,2',4'-tetrabromo-3,3'-diaminodiphenylsulfone, N,N,N',N'-tetraacetyl-4,4'-diaminobenzophenone, N,N,N',N'-tetraacetyl-3,5,3',5'-tetrachloro-4,4'-diaminobenzophenone, N,N,N',N'-tetraacetyl-3,5,3',5'-tetrabromo-4,4'-diaminobenzophenone, N,N,N',N'-tetraacetyl-4,4'-diaminodiphenyl ether, etc.

Among them, the particularly preferable N,N,N',N'-tetraacetyl aromatic diamine compounds are N,N,N',N'-tetraacetyl-2,4,6-tribromo-m-phenylenediamine, N,N,N',N'-tetraacetyl-3,5,3',5'-tetrabromo-4,4'-diaminodiphenylmethane, N,N,N',N'-tetraacetyl-2,4,6-trichloro-m-phenylenediamine, N,N,N',N'-tetraacetyl-3,5,3',5'-tetrachloro-4,4'-diaminodiphenylmethane, etc.

Polyamides to be used in the present invention mean usual synthetic linear polyamides, for example, nylon-6, nylon-10, nylon-11, nylon-12, nylon-66, nylon-610 and copolymeric polyamides consisting mainly of these polymers and nylon-6 and nylon-66 are particularly preferably used.

N,N,N',N'-tetraacetyl aromatic diamine compounds according to the present invention are compounded in an amount of 0.5–15% by weight based on the total amount of the polyamide compositions, whereby a high flame resistance is given to the polyamide. If said amount is less than 0.5% by weight, when the polyamide composition is formed into fibers, a satisfactory flame resistance is not obtained. While, if said amount is more than 15% by weight, the melt spinnability of the polyamide lowers, yarn breakage occurs, continuous spinning becomes difficult and further the obtained polyamide fibers are lower in the yarn qualities of strength, elongation and whiteness and their value for practical use considerably lowers. From these view points, the preferable amount is 1.0–12% by weight, more preferably 2.0–8.0% by weight.

The compound of the present invention may be compounded to the polyamide at any time from the final stage of polymerization of the polyamide to the molding.

The compounding manner is not limited but the process wherein master chips are prepared and compounded optionally is preferable in view of the operability.

To the flame-resistant polyamide composition according to the present invention there may be added additional components, for example, filler, plasticizer, delustrant, heat stabilizer, antioxidant, light stabilizer, whitening agent, thickening agent, antistatic agent nucleating agent and the like. Furthermore, the flame-resistant effect can be more improved by using together therewith another flame retardant and in this case, as the flame retardant to be used together with the flame retardant of the present invention, halogen-containing compounds, phosphorus-containing compounds, antimony compounds, tin compounds and the other metal oxides are preferable.

The flame-resistant polyamide compositions according to the present invention can be very easily molded into fibers, films and the like by usual processes.

Since the compounds of the present invention scarcely cause coloration and gelation of the polyamides and said compounds themselves are stable against light and heat, the shaped articles have very excellent quality, whiteness and light resistance. In general, halogen-containing compounds are readily deteriorated by light, while the compounds of the present invention are very stable against light even when the aromatic ring is substituted with a halogen and the flame-resistant polyamide moldings obtained by compounding said compounds have a very high light resistance.

Furthermore, said compounds are very good in the compatibility with polyamides and the polyamide compositions containing said compounds do not become dirty white and have excellent transparency and luster and said compounds do not bleed out from the polyamides, so that even when said polyamide compositions are spun into filaments, yarn breakage does not occur at all in the spinning, drawing and warping steps.

The reason why the compounds of the present invention have an excellent compatibility with the polyamide is based on the fact that said compounds contain N-diacyl groups. Even when said compounds have a halogenated aromatic nucleus which is inherently incompatible with the polyamides, the effect of the N-diacyl groups is remarkable, so that said compounds are high in their compatibility with the polyamides. Such an effect cannot be obtained in diphenyl compounds having a brominated nucleus and aromatic amide compounds having a brominated nucleus and this is one of the excellent characteristics of the compounds of the present invention.

The compounds of the present invention give a very high flame resistance to the polyamide when added in a small amount. Even when a halogen, which has been generally known as a flame-resistant element, is not contained in said compounds, said compounds develop an excellent flame resistance and this is quite surprising. The reason for such flame-resistant effect is not clear but presumably the N-diacyl groups in said compounds promotes melting drop of the polyamide upon burning and the so-called "drip effect" is developed. When the aromatic nucleus of said compounds is substituted with halogen, a self fire extinguishing effect due to the halogen atom is added to the above described dripping effect and a higher flame resistance can be obtained.

The following examples are given for the purpose of illustration of this invention and are not intended as limitations thereof.

In the examples, "parts" mean by weight.

The intrinsic viscosity $[\eta]$ was measured at 20° C. in a sulfuric acid solution.

The flame resistance of the yarn obtained in the invention was evaluated by the number of contact times of the yarn with flame (hereinafter, referred to as "number of flame-contact times") measured according to the 45° inclined coil method. That is, a twisted yarn rod having a length of 10 cm and a twist number of 10 is produced from 1 g of a yarn, and the twisted yarn rod is inserted into a stainless steel wire coil having a diameter of 10 mm, a coil pitch of 2 mm and a length of 150 mm, the diameter of the wire being 0.5 mm. The stainless steel wire coil is fixed in a burning box at an inclined angle of 45°. The lower end of the twisted yarn rod is contacted with a flame of a micro burner having a flame length of 4.5 cm for 10 seconds to burn the yarn rod, and then the flame is removed. After the fire is extinguished, the position of the yarn rod is displaced together with the stainless steel wire coil and the lower end of the yarn rod is again contacted with the flame. This procedure is repeated until the twisted yarn rod is completely burnt, and the number of contact times of the yarn rod with the flame is counted. This measurement is repeated 5 times with respect to one sample, and the average value is calculated, which is the number of flame-contact times. When the number of flame-contact times of a yarn is not less than 3, the yarn is flame-resistant.

The limiting oxygen index (hereinafter abbreviated as L.O.I.) of a yarn was measured according to JIS K7201-1972.

The light resistance of a yarn was classified into 5 grades as follows. A yarn is wound densely around a black paper, and irradiated with a light for 40 hours by a fadeometer. A yarn, which has not been discolored at all from the original state, is evaluated as fifth grade, and a yarn, which has been discolored noticeably, is evaluated as first grade.

The hue of a yarn was measured as follows. A yarn is wound around a black paper in the same manner as described above, and values of L, a($a_L$) and b($b_L$) are measured by the color and color difference meter, type ND-K5, made by NIPPON DENSHOKU KOGYO CO. The values of L, a and b are those of UCS (uniform chromaticity scale) system proposed by R. S. Hunter. The larger is the L-value, the higher the luminosity is. The larger is the positive a-value, the larger the proportion of red color is, and the larger is the negative a-value, the larger the proportion of green color is. The positive b-value represents the proportion of yellow color, and the negative b-value represents the proportion of blue color. The relation between the values of L, a and b and the tristimulus values, X, Y and Z, of CIE colorimetric system is approximately expressed by the following formulae.

$$L = 100\sqrt{Y}$$

$$a = 175(1.02X - Y)/\sqrt{Y} \text{ and}$$

$$b = 70(Y - 0.847Z)/\sqrt{Y}$$

EXAMPLE 1

Into an autoclave equipped with a reflux condenser and a stirrer was charged 2 l of xylene, and then 1 mole of 3,5,3',5'-tetrabromo-4,4'-diaminodiphenylmethane and 10 moles of acetic anhydride were gradually charged into the autoclave, and the resulting mixture was heated from room temperature to 140° C. by means of an electric heater and further reacted at this temperature for 45 minutes while stirring. After the reaction, the reaction mass was poured into water, and the resulting precipitate was filtered to obtain a crude product in a yield of 98%. The crude product was recrystallized from dioxane to obtain a purified product having a melting point of 268° C. In the infrared absorption spectrum, the first, second and third absorption bands of amide and the absorption band of N-H stretching vibration were not observed, but the characteristic absorption band of N,N-diacetylated compound was observed at 1,720 cm$^{-1}$. Elementary analysis values of the purified product C:37.02%, H:2.73%, N:4.16% and Br:46.5%, which were agreed with the calculated values (C:36.95%, H:2.64%, N:4.11% and Br:46.92%) of N,N,N',N'-tetraacetyl-3,5,3',5'-diaminodiphenylmethane. The N.M.R. spectrum of the purified product, which was measured in a chloroform solution of the product, showed that the product contained hydrogen atom directly bonded to aromatic nucleus and hydrogen atoms assigned to methylene and methyl in a ratio of 2:1:6, and other absorption was not observed in the spectrum. It was ascertained from the above obtained results that the purified product was N,N,N',N'-tetraacetyl-3,5,3',5'-tetrabromo-4,4'-diaminodiphenylmethane.

EXAMPLE 2

In the same manner as described in Example 1, 1 mole of 2,4,6-tribromo-m-phenylenediamine was reacted with 8 moles of acetic anhydride to obtain a crude product in a yield of 98%. The crude product was recrystallized from dioxane to obtain a purified product having a melting point of 167° C. In the infrared absorption spectrum of the purified product, the first, second and third absorption bands of amide and the absorption band of N-H stretching vibration were not observed, but the characteristic absorption band of N,N-diacetylated compound was observed at 1,720 cm$^{-1}$.

Elementary analysis values of the purified product were C:32.86%, H:2.46%, N:5.45% and Br:41.6%, which agreed with the calculated values (C:32.75%, H:2.53%, N:5.46% and Br:46.8%) of N,N,N',N'-tetraacetyl-2,4,6-tribromo-m-phenylenediamine. The N.M.R. spectrum of the purified product measured in the same manner as described in Example 1 showed that the product contained hydrogen atom directly bonded to aromatic nucleus and hydrogen atom assigned to methyl in a ratio of 1:12, and other absorption was not observed in the spectrum. It was ascertained from the above obtained results that the purified product was N,N,N',N'-tetraacetyl-2,4,6-tribromo-m-phenylenediamine.

EXAMPLE 3

In the same manner as described in EXAMPLE 1, 1 mole of 3,5,3',5'-tetrachloro-4,4'-diaminodiphenylmethane was reacted with 10 moles of acetic anhydride to obtain a crude product in a yield of 97%. The crude product was recrystallized from dioxane to obtain a purified product having a melting point of 245° C. In the infrared absorption spectrum of the purified product, the first, second and third absorption bands of amide and the absorption band of N-H stretching vibration were not observed, but the characteristic absorption band of N,N-diacetylated compound was observed at 1,720 cm$^{-1}$. Elementary analysis values of the purified product were C:49.91%, H:3.62%, N:5.50% and Cl:28.0%, which agreed with the calculated values (C:50.00%, H:3.57%, N:5.56% and Cl:28.2%) of N,N,N',N'-tetraacetyl-3,5,3',5'-tetrachloro-4,4'-diaminodiphenylmethane. The N.M.R. spectrum of the purified product measured in the same manner as described in Example 1 showed that the product contained hydrogen atom directly bonded to aromatic nucleus and hydrogen atoms assigned to methylene and methyl in a ratio of 2:1:6, and other absorption was not observed in the spectrum. It was ascertained from the above obtained results that the purified product was N,N,N',N'-tetraacetyl-3,5,3',5'-tetrachloro-4,4'-diaminodiphenylmethane.

EXAMPLE 4

In the same manner as described in Example 1, 1 mole of 2,4,6-trichloro-m-phenylenediamine was reacted with 8 moles of acetic anhydride to obtain a crude product in a yield of 96%. The crude product was recrystallized from dioxane to obtain a purified product having a melting point of 150° C. In the infrared absorption spectrum of the purified product, the first, second and third absorption bands of amide and the absorption band of N-H stretching vibration were not observed, but the characteristic absorption band of N,N-diacetylated compound was observed at 1,720 cm$^{-1}$. Elementary analysis values of the purified product were C:42.28%, H:3.42%, N:7.41% and Cl:28.1%, which agreed with the calculated values (C:44.27%, H:3.42%, N:7.38% and Cl:28.1%) of N,N,N',N'-tetraacetyl-2,4,6-trichloro-m-phenylenediamine. The N.M.R. spectrum of the purified product measured in the same manner as described in Example 1 showed that the product contained hydrogen atom directly bonded to aromatic nucleus and hydrogen atom assigned to methyl in a ratio of 1:12, and other absorption was not observed in the spectrum. It was ascertained from the above obtained results that the purified product was N,N,N',N'-tetraacetyl-2,4,6-trichloro-m-phenylenediamine.

EXAMPLE 5

In the same manner as described in Example 1, 1.0 mole of each of the diamines shown in the following Table 1 was reacted with 10.0 moles of acetic anhydride to obtain N,N,N',N'-tetraacetylated compounds of the diamine. The physical property and elementary analysis value of the purified products and the yield of the crude products are shown in Table 1. In the infrared absorption spectrum of the purified products measured by the nujol process, a characteristic absorption band of diacetylated compound was observed at 1,710–1,720 cm$^{-1}$ in all products.

As seen from Table 1, the desired N,N,N',N'-tetraacetylated compounds were obtained in a high yield.

Table 1
| Experiment No. | Starting diamine | Product Structural formula | Elementary analysis value(%) (numeral in the parentheses is calculated value) | | | | Melting point (°C) | Yield of crude product (%) |
|---|---|---|---|---|---|---|---|---|
| | | | C | H | N | Halogen | | |
| 1 |  |  | 60.95 (60.87) | 5.71 (5.80) | 10.20 (10.14) | — | 134 | 96 |
| 2 | 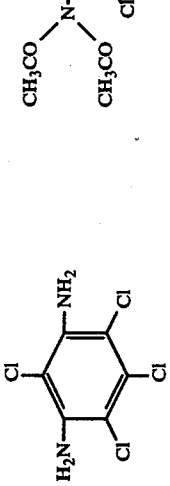 | 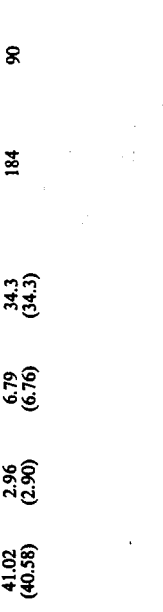 | 41.02 (40.58) | 2.96 (2.90) | 6.79 (6.76) | 34.3 (34.3) | 184 | 90 |
| 3 |  | 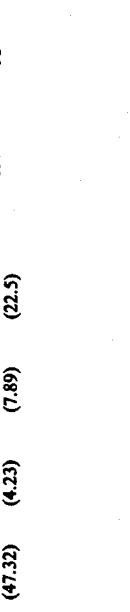 | 47.27 (47.32) | 4.21 (4.23) | 7.93 (7.89) | 23.1 (22.5) | 157 | 90 |
| 4 | 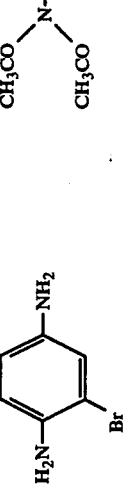 |  | 38.52 (38.71) | 3.29 (3.23) | 6.50 (6.45) | 37.0 (36.9) | 170 | 98 |
| 5 | 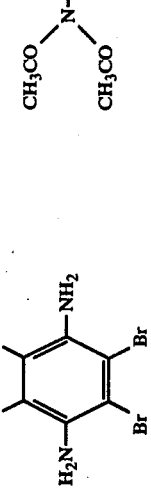 | 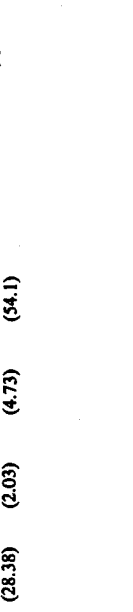 | 28.52 (28.38) | 2.19 (2.03) | 4.68 (4.73) | 53.3 (54.1) | 196 | 94 |
| 6 | 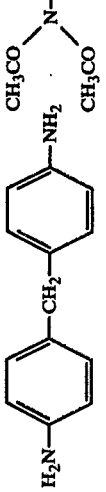 | 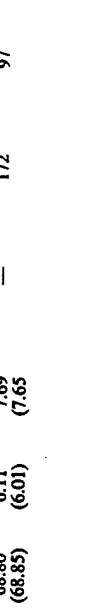 | 68.80 (68.85) | 6.11 (6.01) | 7.69 (7.65) | — | 172 | 97 |

Table 1-continued
| Experiment No. | Starting diamine | Product Structural formula | C | H | N | Halogen | Melting point (°C) | Yield of crude product (%) |
|---|---|---|---|---|---|---|---|---|
| 7 | 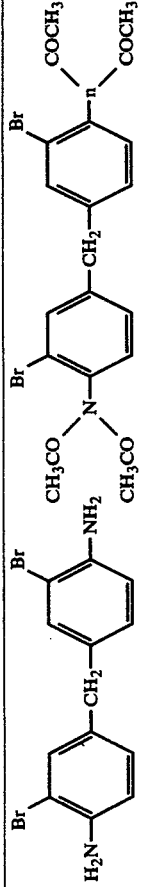 | 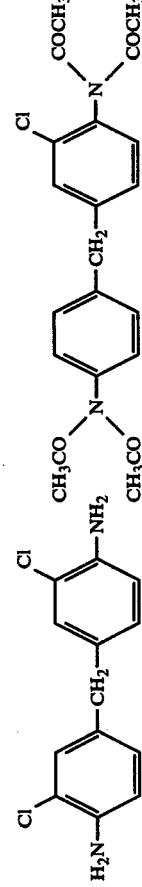 | 48.12 (48.09) | 3.77 (3.82) | 5.30 (5.34) | 30.1 (30.5) | 232 | 95 |
| 8 | 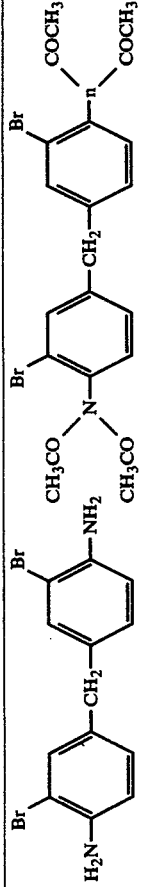 | 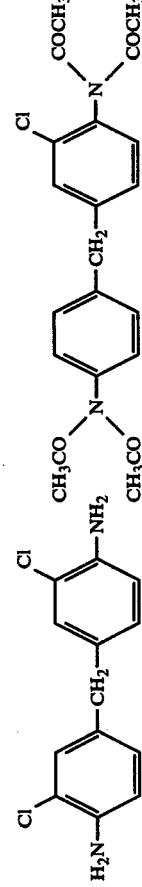 | 58.10 (57.93) | 4.50 (4.60) | 6.41 (6.44) | 16.1 (16.3) | 204 | 95 |
| 9 | 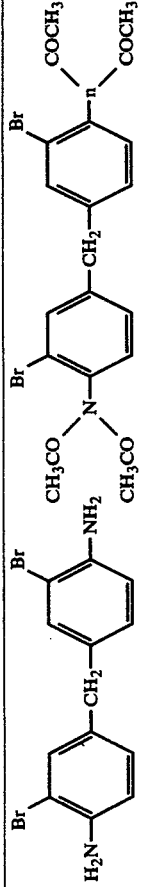 | 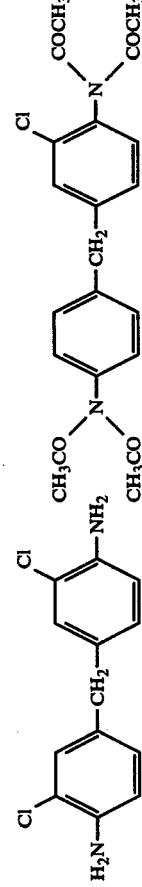 | 36.19 (36.21) | 2.33 (2.30) | 4.04 (4.02) | 45.7 (46.0) | 275 | 93 |
| 10 | 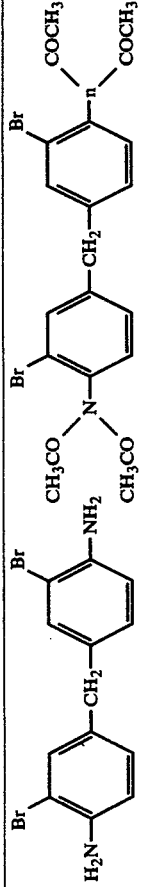 | 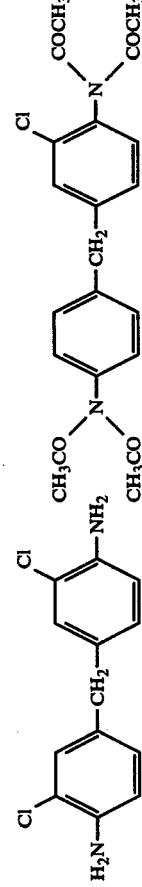 | 38.48 (38.41) | 1.79 (4.27) | 43.0 (43.3) | 272 | 91 | |
| 11 | 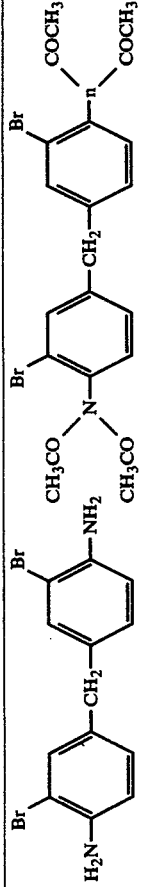 | 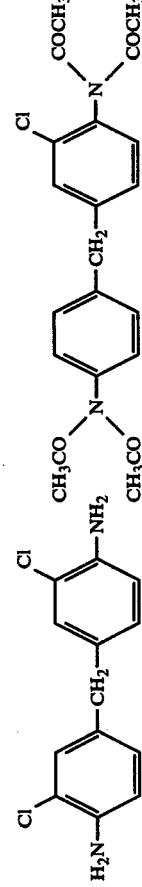 | 43.06 (43.32) | 2.97 (2.89) | 5.00 (5.05) | 25.9 (25.6) | 261 | 96 |
| 12 | 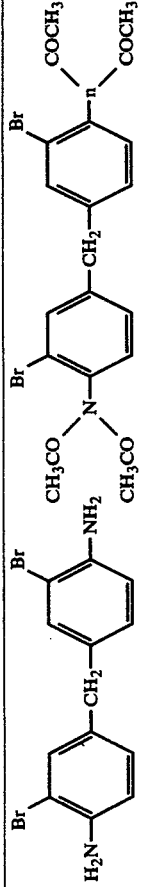 | 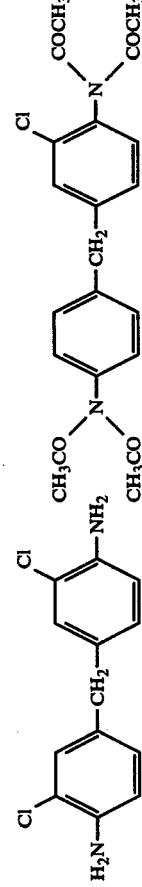 | 47.10 (47.06) | 3.70 (3.59) | 5.54 (5.49) | 32.0 (31.37) | 241 | 93 |

Table 1-continued
| Experiment No. | Starting diamine | Product Structural formula | Elementary analysis value(%) (numeral in the parentheses is calculated value) | | | | Melting point (°C) | Yield of crude product (%) |
|---|---|---|---|---|---|---|---|---|
| | | | C | H | N | Halogen | | |
| 13 | 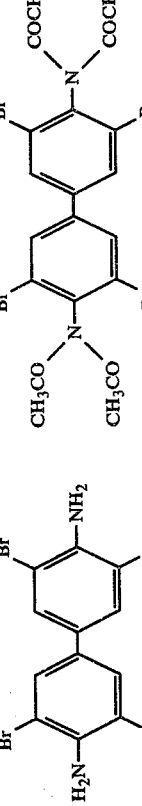 | 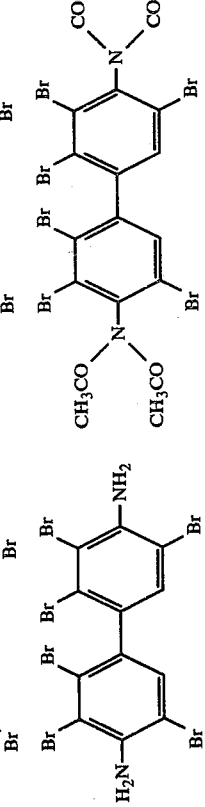 | 36.08 (35.93) | 2.33 (2.40) | 4.20 (4.19) | 47.8 (4.19) | 275 | 98 |
| 14 | 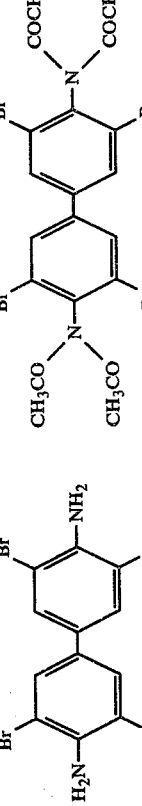 | 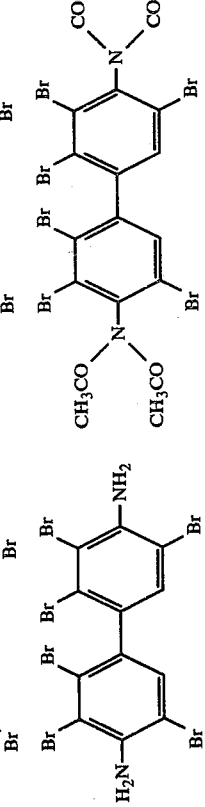 | 29.07 (29.06) | 1.65 (1.69) | 3.50 (3.39) | 58.9 (58.1) | | |

EXAMPLE 6

In the same manner as described in Example 1, 1.0 mole of 3,5,3',5'-tetrabromo-4,4'-diaminodiphenylmethane was reacted with various numbers of moles of acetic anhydride to examine the change in the yield of the crude product of desired N,N,N',N'-tetraacetyl-3,5,3',5'-tetrabromo-4,4'-diaminodiphenylmethane. The obtained results are shown in the following Table 2.

It can be seen from Table 2 that acetic anhydride should be used in an amount of at least 4 moles, preferably at least 6 moles, based on 1 mole of diamine.

Table 2

| Experiment No. | Amount of acetic anhydride (moles) | Yield of crude N,N,N',N'-tetraacetylated compound (%) |
|---|---|---|
| 1 | 30 | 98 |
| 2 | 20 | 98 |
| 3 | 10 | 98 |
| 4 | 8 | 98 |
| 5 | 6 | 96 |
| 6 | 4 | 86 |
| 7 | 3 | 52 |
| 8 | 2 | 20 |

EXAMPLE 7

Into a round bottom flask of 300 ml capacity equipped with a stirrer, a thermometer and a reflux condenser were charged 0.1 mole of 2,4,6-tribromo-m-phenylenediamine, 0.6 mole of acetic anhydride and 100 ml of xylene, and the resulting mixture was reacted at various temperatures for various periods of time. The obtained results are shown in the following Table 3.

Table 3

| Experiment No. | Reaction temperature (° C) | Reaction time (min.) | Yield of crude N,N,N',N'-tetraacetylated compound (%) |
|---|---|---|---|
| 1 | 145 | 60 | 98 |
| 2 | 135 | 5 | 75 |
| 3 | 135 | 10 | 91 |
| 4 | 135 | 15 | 96 |
| 5 | 135 | 30 | 98 |
| 6 | 130 | 60 | 98 |
| 7 | 120 | 60 | 96 |
| 8 | 110 | 60 | 82 |
| 9 | 110 | 120 | 86 |
| 10 | 105 | 60 | 70 |
| 11 | 100 | 60 | 38 |
| 12 | 90 | 60 | 5 |
| 13 | 90 | 120 | 6 |

As seen from Table 3, the reaction temperature should be at least 105° C., preferably at least 120° C. The reaction time should be varied depending upon the reaction temperature, but is preferred to be at least 10 minutes.

EXAMPLE 8

80 parts of dried chips of nylon-6 having an $[\eta]$ of 1.28 and a water content of 0.054% and 20 parts of N,N,N',N'-tetraacetyl-3,5,3',5'-tetrabromo-4,4'-diaminodiphenylmethane obtained in Example 1 were mechanically mixed, and the resulting mixture was melted at 250° C. in an extruder of 40 mm$\phi$ and then extruded through the extruder to form a gut, and the gut was cooled and cut into chips to obtain master chips having an $[\eta]$ of 0.70. Then, the resulting master chips and ordinary nylon-6 chips were mixed in various mixing ratios, and the resulting mixture was dried to decrease the water content to 0.06–0.07%. The mixture was then melt spun through an extruder type spinning apparatus of 20 mm$\phi$, and the spun filaments were drawn to obtain a drawn yarn of 40 d/10 f. Physical properties of the resulting yarns are shown in the following Table 4.

Table 4

| Experiment No. | Content of N,N,N',N'-tetraacetyl-3,5,3',5'-tetrabromo-4,4'-diaminodiphenylmethane (wt. %) | Spinnability | Yarn Properties Strength (g/d) | Elongation (%) | Hue b-value | Flame resistance Number of flame-contact times | Light resistance (grade) |
|---|---|---|---|---|---|---|---|
| 1 | 0 | good | 5.1 | 34.8 | 0.5 | 1.2 | 5 |
| 2 | 0.2 | " | 5.1 | 33.6 | 0.3 | 2.0 | 5 |
| 3 | 0.5 | " | 5.2 | 32.9 | 0.4 | 3.0 | 5 |
| 4 | 1.0 | " | 5.1 | 33.0 | 0.5 | 3.4 | 5 |
| 5 | 2.0 | " | 5.0 | 31.9 | 0.5 | 4.0 | 5 |
| 6 | 4.0 | " | 4.5 | 32.4 | 0.4 | 5.2 | 5 |
| 7 | 6.0 | " | 4.2 | 30.7 | 0.8 | 6.8 | 5 |
| 8 | 8.0 | " | 4.0 | 30.1 | 1.0 | 7.0 | 5 |
| 9 | 10.0 | Filament is sometimes broken | 3.8 | 28.3 | 1.2 | 6.8 | 5 |
| 10 | 12.0 | " | 3.6 | 28.7 | 1.9 | 7.0 | 4–5 |
| 11 | 15.0 | Yarn is sometimes broken | 3.2 | 26.1 | 2.7 | 7.0 | 4 |
| 12 | 20.0 | Yarn is often broken | 1.8 | 20.5 | 4.8 | 6.8 | 4 |

It can be seen from Table 4 that the proper mixing amount of the compound of the present invention is 0.5–15% by weight based on the total amount of the compound and nylon-6 in view of the flame resistance, yarn properties, whiteness and light resistance of the resulting yarn.

EXAMPLE 9

Each of the tetraacetylated compounds produced in Examples 2–5 was mixed with powdery nylon-6 having an $[\eta]$ of 1.28, and the resulting mixture was extruded through an extruder of 20 mm$\phi$ to obtain a gut having a diameter of about 2 mm. The L.O.I. of the resulting guts was measured to obtain the results shown in the following Table 5.

All of the resulting guts are superior to the blank in the flame resistance.

Table 5

| Experiment No. | Tetraacetylated compound | Mixing amount (wt. %) | L.O.I. |
|---|---|---|---|
| 1 (5-1) | CH₃CO-N(COCH₃)-C₆H₄-N(COCH₃)(COCH₃) (1,3-phenylene) | 5 | 26.5 |
| 2 (2) | tribromo-1,3-phenylene tetraacetyl | 3 | 28.0 |
| 3 (2) | " | 5 | 29.5 |
| 4 (2) | " | 7 | 31.0 |
| 5 (4) | trichloro-1,3-phenylene tetraacetyl | 3 | 27.5 |
| 6 (4) | " | 5 | 28.5 |
| 7 (5-2) | tetrachloro-1,4-phenylene tetraacetyl | 5 | 28.5 |
| 8 (5-3) | monobromo-1,4-phenylene tetraacetyl | 5 | 27.5 |
| 9 (5-4) | dibromo-1,4-phenylene tetraacetyl | 5 | 28.5 |
| 10 (5-5) | tetrabromo-1,4-phenylene tetraacetyl | 5 | 29.5 |
| 11 (5-6) | 4,4'-methylenebis(phenylene) tetraacetyl | 5 | 26.0 |
| 12 (5-7) | dibromo-4,4'-methylenebis(phenylene) tetraacetyl | 5 | 28.0 |
| 13 (5-8) | dichloro-4,4'-methylenebis(phenylene) tetraacetyl | 5 | 27.5 |

Table 5-continued

| Experiment No. | Tetraacetylated compound | Mixing amount (wt. %) | L.O.I. |
|---|---|---|---|
| 14 (3) | 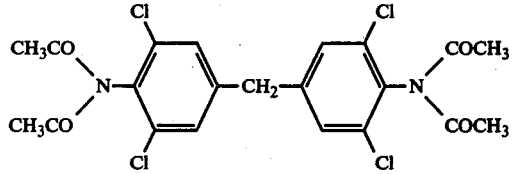 | 3 | 27.5 |
| 15 (3) | " | 5 | 28.5 |
| 16 (5-9) | 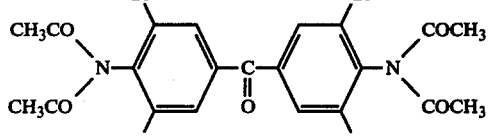 | 5 | 30.0 |
| 17 (5-10) | 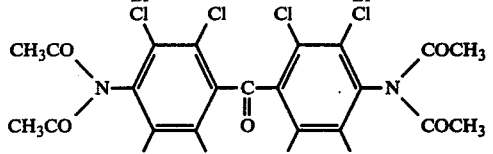 | 5 | 29.5 |
| 18 (5-11) | 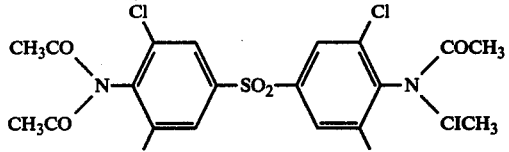 | 5 | 28.0 |
| 19 (5-12) | 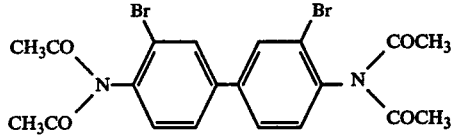 | 5 | 28.0 |
| 20 (5-13) | 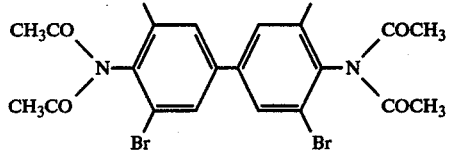 | 5 | 30.5 |
| 21 (5-14) | 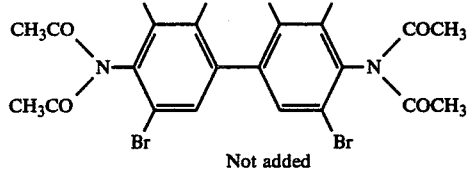 | 5 | 31.0 |
| 22 | Not added | 0 | 24.0 |

*The numeral in the parentheses shows Example No., or Example No. and Experiment No., in which the acetylated compound was produced.

EXAMPLE 10

Powders of N,N,N',N'-tetraacetyl-3,5,3',5'-tetrabromo-4,4'-diaminodiphenylmethane produced in Example 1 were mixed with chips of delustered ordinary nylon-6 containing titanium dioxide and having an [η] of 1.28, and the resulting mixture was melt spun through an extruder of 20 mmφ in a conventional manner. The spun filaments were taken up on a take-up device at a rate of 800 m/min and then drawn to 3.5 times their original length at a rate of 750 m/min to obtain a multifilament yarn of 40 d/10 f. As a control sample, N,N'-diacetyl-3,5,3',5'-tetrabromo-4,4'-diaminodiphenylmethane was used, and a multifilament yarn of 40 d/10 f was produced in the same manner as described above. In the above described mixing, the amount of the tetraacetylated or diacetylated compound to be mixed with the polyamide was varied so that the resulting mixture would contain the tetraacetylated or diacetylated compound in an amount shown in the following Table 6. Whether or not the acetylated compound bled at the drawing was observed and the hue and L.O.I. of the resulting yarn were measured. The obtained results are shown in Table 6.

It can be seen from Table 6 that N,N,N',N'-tetraacetyl-3,5,3',5'-tetrabromo-4,4'-diaminodiphenylmethane does not bleed and is smaller in the coloration of the resulting yarn than N,N'-diacetyl-3,5,3',5'-tetrabromo-4,4'-diaminodiphenylmethane, and further can provide an excellent flame resistance to the resulting yarn by the use of a small amount.

Table 6

| Experiment No. | Acetylated compound | Mixing amount (wt. %) | Hue L | Hue a | Hue b | Bleeding at the drawing | L.O.I. | Remarks |
|---|---|---|---|---|---|---|---|---|
| 1 | $CH_3CO$–N(COCH_3)–(2,6-Br_2-phenyl)–$CH_2$–(2,6-Br_2-phenyl)–N(COCH_3)_2 | 3 | 93.4 | 0.1 | 0.4 | not bleed | 28.5 | Spinning and drawing are smooth |
| 2 | " | 5 | 93.0 | 0.1 | 0.6 | " | 29.5 | " |
| 3 | " | 7 | 92.8 | 0.3 | 0.8 | " | 31.0 | " |
| 4 | $CH_3COHN$–(2,5-Br_2-phenyl)–$CH_2$–(2,5-Br_2-phenyl)–$NHCOCH_3$ | 3 | 90.1 | 0.3 | 1.2 | " | 24.0 | " |
| 5 | " | 5 | 89.0 | 0.4 | 1.4 | bleed | 25.0 | Filament is often broken |
| 6 | " | 7 | 88.2 | 0.6 | 1.7 | " | 26.0 | Yarn is often broken |

EXAMPLE 11

In the same manner, as described in Example 1, 0.1 mole of 2,2-bis(3′,5′-dibromo-4′-aminophenyl)propane was reacted with 3.0 moles of acetic anhydride. However, in this Example, the reaction temperature and reaction time were varied as shown in the following Table 7. The obtained results are shown in Table 7. In Table 7, the reaction time means a period of time ranging from the time, at which the reaction system has reached the given reaction temperature, to the time, at which the reaction system is poured into water and cooled.

It can be seen from Table 7 that the reaction temperature should be not lower than 105° C., preferably not lower than 115° C., more preferably not lower than 120° C., and the reaction time should be at least 10 minutes. When the reaction temperature is low, the reaction time is preferred to be at least 15 minutes.

Table 7

| Experiment No. | Reaction temperature (° C) | Reaction time (min.) | Yield of crude N,N,N′,N′-tetraacetylated compound (%) |
|---|---|---|---|
| 1 | 150 | 30 | 100 |
| 2 | 150 | 10 | 96 |
| 3 | 120 | 30 | 93 |
| 4 | 120 | 15 | 90 |
| 5 | 115 | 30 | 91 |
| 6 | 115 | 15 | 85 |
| 7 | 105 | 30 | 70 |
| 8 | 105 | 15 | 58 |
| 9 | 105 | 3 | 10 |
| 10 | 100 | 30 | 20 |

EXAMPLE 12

95 parts of dried chips of nylon-6 having an $[\eta]$ of 1.28 and a water content of 0.068% was mechanically mixed with 5 parts of N,N,N′,N′-tetraacetyl-3,5,3′,5′-tetrabromo-4,4′-diaminodiphenylmethane produced in Example 1, and the resulting mixture was melted at 270° C. in an extruder type spinning apparatus of 20 mm$\phi$ and extruded through a spinneret of 0.25 mm$\phi \times$ 18 holes kept at 250° C. while metering by a gear pump. The extruded filaments were taken up on a take-up device at a spinning rate of 700 m/min to obtain an undrawn multifilament yarn of 265 d/18 f. White powders did not deposit at all on the yarn guide of the take-up device and on the rollers, and the spinning was able to be carried out smoothly. then, the undrawn yarn was drawn at a draw ratio of 3.8 and at a draw rate of 500 m/min to obtain a drawn yarn of 70 d/18 f. White powders did not deposit at all on the drawing rollers and the guide, and the drawing was able to be carried out smoothly.

In the same manner as described above, a flame-resistant nylon-6 yarn was produced from 95 parts of the above described nylon-6 dried chips and 5 parts of N,N,N′,N′-tetraacetyl-2,4,6-tribromo-m-phenylenediamine produced in Example 2. Also in this case, the spinning and drawing were able to be carried out smoothly.

For comparison, nylon-6 containing hexabromobisphenyl and ordinary nylon-6 containing no flame retardant were spun and drawn in the same manner as described above. When hexabromobisphenyl was used, white powders deposited on the rollers at the spinning, and the spun filaments were often broken. Further, when the spun filaments were drawn, a large amount of white powders deposited on the yarn guide of the drawing machine and on the rollers, and monofilament breakage and yarn breakage occurred very often, and the drawing was not carried out smoothly.

Physical properties of the above obtained drawn yarns are shown in the following Table 8.

It can be seen from Table 8 that the flame-resistant polyamide fibers obtained by the method of the present invention have an excellent flame resistance and are not colored, and further are very excellent in the light resistance. On the other hand, the polyamide fiber containing hexabromobisphenyl of comparative sample (Experiment No. 3) is colored, and further colors noticeably by the irradiation of light. Moreover, when the amount of hexabromobiphenyl contained in a polyamide is about 5% by weight, the flame resistance of the resulting polyamide fiber is insufficient.

Table 8

| Experiment No. | Flame retardant | Mixing amount (wt. %) | Hue L | Hue a | Hue b | Light resistance (grade) | Flame resistance Number of flame-contact times |
|---|---|---|---|---|---|---|---|
| 1 | N,N,N',N'-Tetraacetyl-3,5,3',5'-tetrabromo-4,4'-diamonodiphenyl-methane | 5 | 93.1 | 0.0 | 0.4 | 5 | 6.8 |
| 2 | N,N,N',N'-Tetraacetyl-2,4,6-tribromo-m-phenylenediamine | 5 | 93.0 | 0.1 | 0.5 | 5 | 6.4 |
| 3 | Hexabromobiphenyl | 5 | 72.2 | 2.5 | 6.3 | 2 | 2.4 |
| 4 | Not added | 0 | 93.2 | 0.0 | 0.5 | 5 | 1.2 |

Then, 4 kinds of 2-ply yarns were produced from the above obtained nylon-6 yarns respectively, and knitted into 4 kinds of tubular knitted cloths by means of a circular knitting machine. The tubular knitted cloth, after scoured, was dyed with Kayanol Cyanine 6B (trademark, made by NIPPON KAYAKU CO.) in a dye bath containing the dye in an owf of 0.5% and acetic acid in an owf of 3.0% at a bath ratio of 1:50 by raising the temperature of the dye bath from 40° C. to 100° C. in 40 minutes and keeping the bath at 100° C. for 30 minutes. After dyeing, the knitted cloth was washed with water and then dried to obtain a dyed cloth, and the dyeabilities of the 4 kinds of cloths were compared. Then, the dyed cloth was subjected to an ordinary water-washing or a dry-cleaning with perchloroethylene. The flame resistances of the cloth before and after the washing were measured by the number of flame-contact times in the 45° inclined coil method. The results of the above described tests are shown in the following Table 9.

Table 9

| Experiment No. | Flame retardant | Dyeability | Number of flame-contact times Before washing | After water washing repeated 10 times | After dry cleaning repeated 10 times |
|---|---|---|---|---|---|
| 5 | N,N,N',N'-Tetraacetyl-3,5,3',5'-tetrabromo-4,4'-diaminodiphenyl-methane | bright deep blue | 6.8 | 6.8 | 7.0 |
| 6 | N,N,N',N'-Tetraacetyl-2,4,6-tribromo-m-phenylenediamine | " | 6.4 | 6.6 | 6.4 |
| 7 | Hexabromobiphenyl | sordid blue | 2.4 | 2.2 | 1.8 |
| 8 | Not added | bright deep blue | 1.2 | 1.2 | 1.4 |

What is claimed is:

1. Flame-resistant polyamide composition containing 0.5 to 15% by weight, based on the total amount of the polyamide composition, of N,N,N',N'-tetraacetyl aromatic diamine compound having the formula (1)

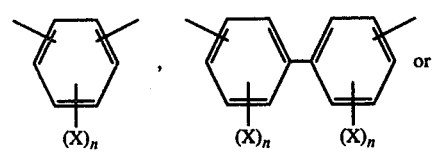

wherein R is

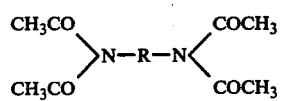

-continued

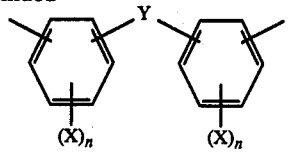

wherein X is Br or Cl; Y is alkylene having 1 to 3 carbon atoms, alkylidene having 1 to 3 carbon atoms, carbonyl, sulfonyl or oxygen; and m and n are 0 or an integer of 1 to 4.

2. The flame-resistant composition as claimed in claim 1 containing 1.0–12.0% by weight, based on the total amount of the polyamide composition, of the formula (1) compound.

3. Flame-resistant polyamide fiber containing 0.5 to 15% by weight, based on the total amount of the polyamide fiber, of N,N,N',N'-tetraacetyl aromatic diamine compound having the formula (1)

wherein R is

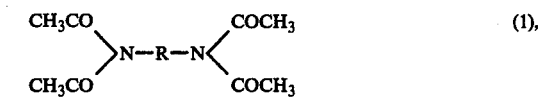

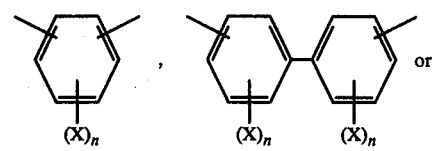

wherein X is Br or Cl; Y is alkylene having 1 to 3 carbon atoms, alkylidene having 1 to 3 carbon atoms, carbonyl, sulfonyl or oxygen; and m and n are zero or an integer of 1 to 4.

4. The fiber claimed in claim 3, containing 1.0–12.0% by weight, based on the total amount of the polyamide fiber, of the formula (1) compound.

5. The composition of claim 1 wherein the balance of said composition consists essentially of a synthetic linear polyamide selected from the group consisting of nylon-6, nylon-10, nylon-11, nylon-12, nylon-66, nylon-610 and copolymers thereof.

6. The fiber claimed in claim 3, wherein R is

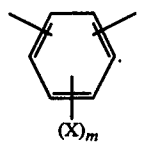

7. The fiber claimed in claim 3, wherein R is

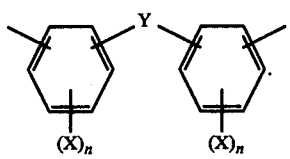

8. The fiber claimed in claim 6, wherein the formula (1) compound is N,N,N',N'-tetraacetyl-2,4,6-trichloro-m-phenylenediamine of N,N,N',N'-tetraacetyl-2,4,6-tribromo-m-phenylenediamine.

9. The fiber claimed in claim 7, wherein the formula (1) compound is N,N,N',N'-tetraacetyl-3,5,3',5'-tetrachloro-4,4'-diaminodiphenylmethane or N,N,N',N'-tetraacetyl-3,5,3',5'-tetrabromo-4,4'-diaminodiphenylmethane.

10. The flame-resistant composition as claimed in claim 1, wherein R is

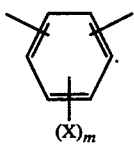

11. The flame-resistant composition as claimed in claim 1, wherein R is

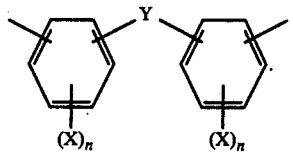

12. The flame-resistant composition as claimed in claim 10, wherein the formula (1) compound is N,N,N',N'-tetraacetyl-2,4,6-trichloro-m-phenylenediamine or N,N,N',N'-tetraacetyl-2,4,6-tribromo-m-phenylenediamine.

13. The flame-resistant composition as claimed in claim 11, wherein the formula (1) compound is N,N,N',N'-tetraacetyl-3,5,3',5'-tetrachloro-4,4'-diaminodiphenylmethane or N,N,N',N'-tetraacetyl-3,5,3',5'-tetrabromo-4,4'-diaminodiphenylmethane.

14. N,N,N',N'-tetraacetyl aromatic diamine compound having the formula

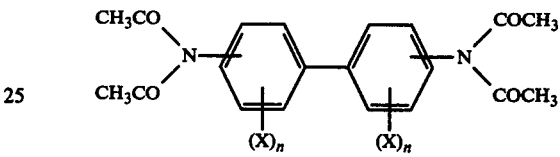

wherein X is Br or Cl and n is an integer of 1 to 4.

15. The compound as claimed in claim 14, wherein n is 2.

16. The compound as claimed in claim 14, wherein X is Br.

17. N,N,N',N'-tetraacetyl aromatic diamine compound having the formula

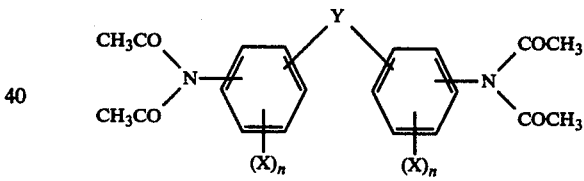

wherein X is Br or Cl, Y is alkylene having 1 to 3 carbon atoms, alkylidene having 1 to 3 carbon atoms, carbonyl, sulfonyl or oxygen, and n is an integer of 1 to 4.

18. The compound as claimed in claim 17, wherein Y is methylene.

19. The compound as claimed in claim 17, wherein n is 2.

20. The compound as claimed in claim 17, wherein X is Br.

21. The compound as claimed in claim 17, wherein said compound is N,N,N',N'-tetraacetyl-3,5,3',5'-tetrachloro-4,4'-diaminodiphenylmethane.

22. The compound as claimed in claim 17, wherein said compound is N,N,N',N'-tetraacetyl-3,5,3',5'-tetrabromo-4,4'-diaminodiphenylmethane.

* * * * *

UNITED STATES PATENT AND TRADEMARK OFFICE
CERTIFICATE OF CORRECTION

PATENT NO. : 4 144 225
DATED : March 13, 1979
INVENTOR(S) : Keio Yamanaka et al

It is certified that error appears in the above-identified patent and that said Letters Patent are hereby corrected as shown below:

Column 25, line 65; change "  " to ---  ---.

Column 26, line 60; change "  " to ---  ---.

Column 27, line 39; change "of" to ---or---.

Signed and Sealed this

Twenty-fourth Day of July 1979

[SEAL]

Attest:

Attesting Officer

LUTRELLE F. PARKER
Acting Commissioner of Patents and Trademarks